United States Patent [19]

Morse

[11] 4,258,538
[45] Mar. 31, 1981

[54] GRASS CATCHER BAG

[75] Inventor: Richard R. Morse, Galesburg, Ill.

[73] Assignee: Outboard Marine Corporation, Waukegan, Ill.

[21] Appl. No.: 39,498

[22] Filed: May 16, 1979

[51] Int. Cl.$^3$ .............................................. B65D 33/16
[52] U.S. Cl. ............................................ 56/202; 150/33
[58] Field of Search ............... 56/199, 200, 202, 203, 56/204, 205, 206; 229/54 R; 150/2, 12, 5, 33, 42

[56] References Cited

U.S. PATENT DOCUMENTS

| | | | |
|---|---|---|---|
| 1,164,833 | 12/1915 | Macaulay | 150/33 |
| 1,753,458 | 4/1930 | Willis | 150/5 |
| 2,318,563 | 5/1943 | Smith | 150/33 |
| 2,513,040 | 6/1950 | Miller | 150/12 |
| 3,295,643 | 1/1967 | Peterson et al. | 150/42 |
| 3,732,675 | 5/1973 | Armstrong | 56/202 |
| 4,175,603 | 11/1979 | Iaboni et al. | 56/202 |

*Primary Examiner*—Robert A. Hafer
*Attorney, Agent, or Firm*—Michael, Best & Friedrich

[57] ABSTRACT

A lawn mower comprises a chassis including a grass discharge outlet, and a grass collection bag having a main body portion in which two access openings are formed is removable attached to the chassis with one of the access openings connected to the grass discharge outlet. A first panel is attached to the other access opening and is movable between an open position which permits grass clippings accumulated in the bag to be removed or dumped through the access opening, and a closed position which blocks the access opening. Second and third panels are attached to the first panel and to the main body portion of the bag on opposite sides of the access opening and are foldable upon themselves in response to movement of the first panel toward its closed position for preventing the escape of grass clippings from the side edges of the opening when the first panel is in its closed position. A closure assembly is provided for securing the first panel in its closed, or sealed, position.

31 Claims, 16 Drawing Figures

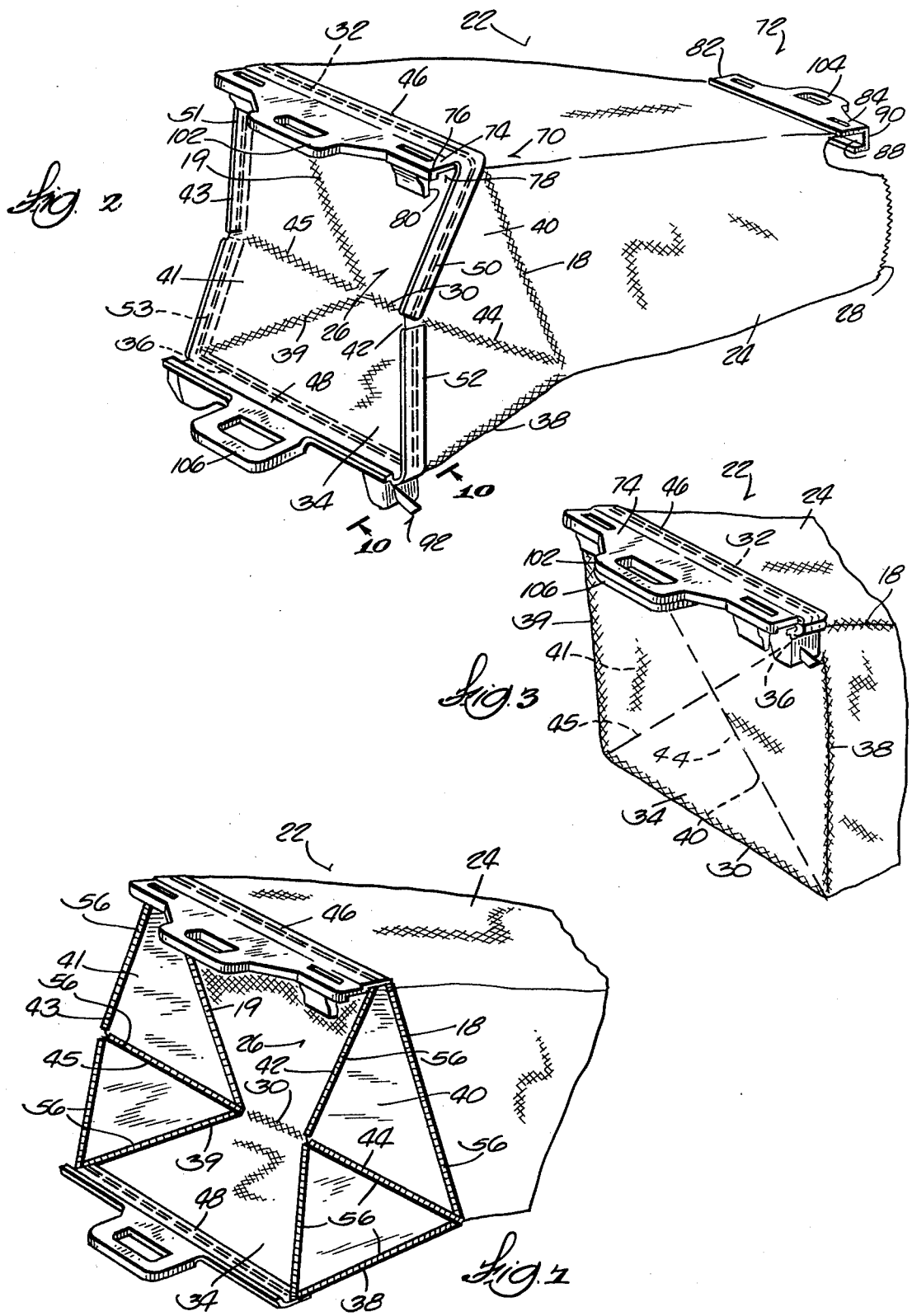

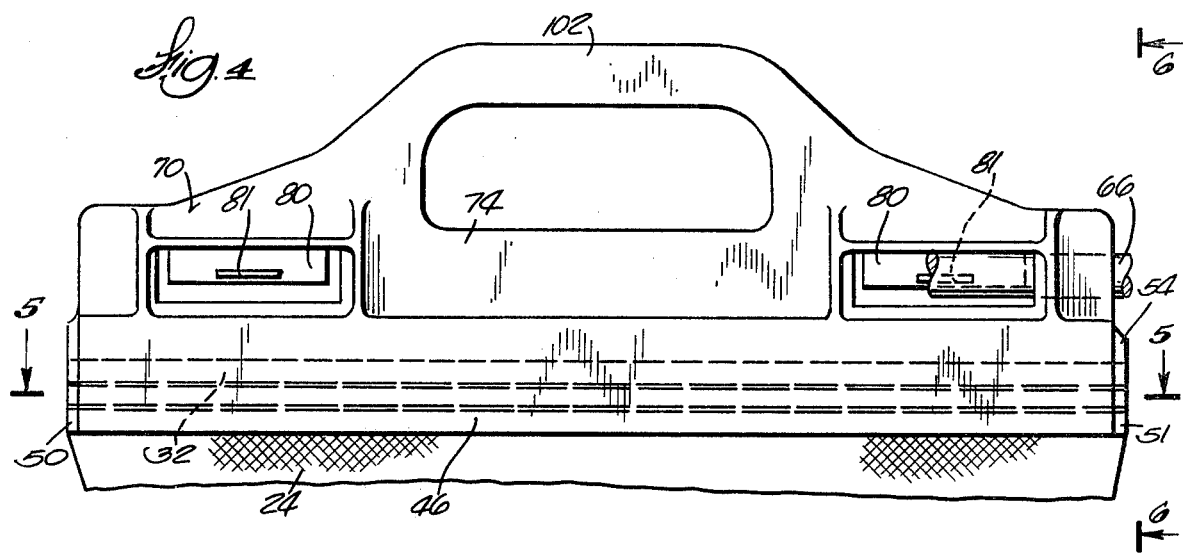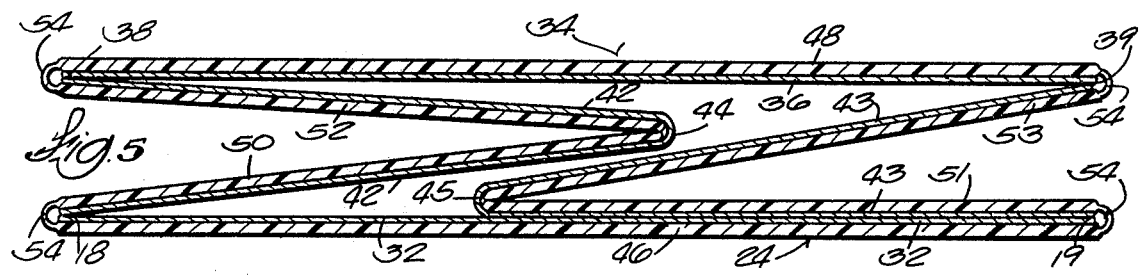

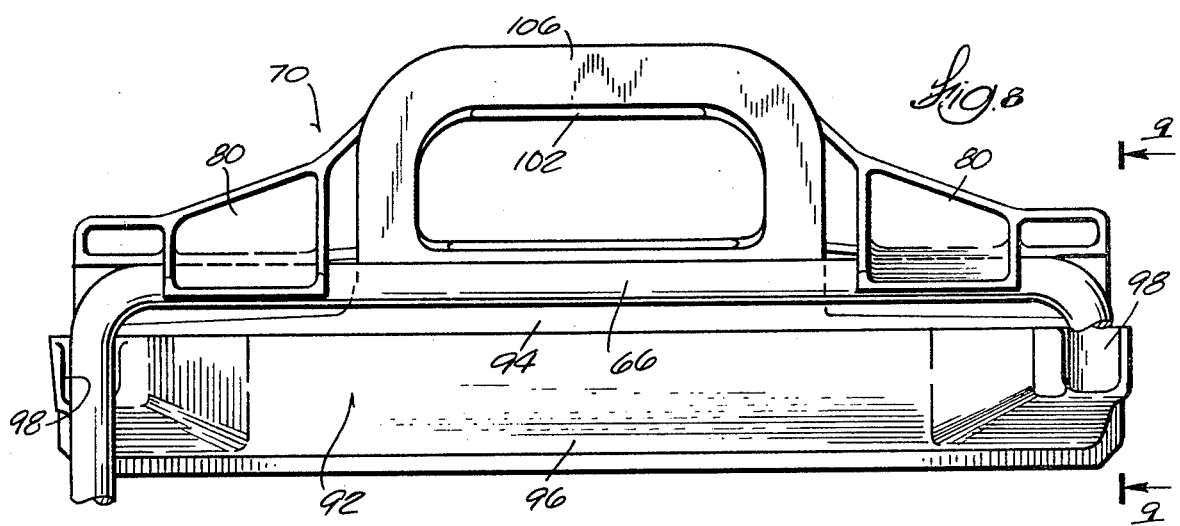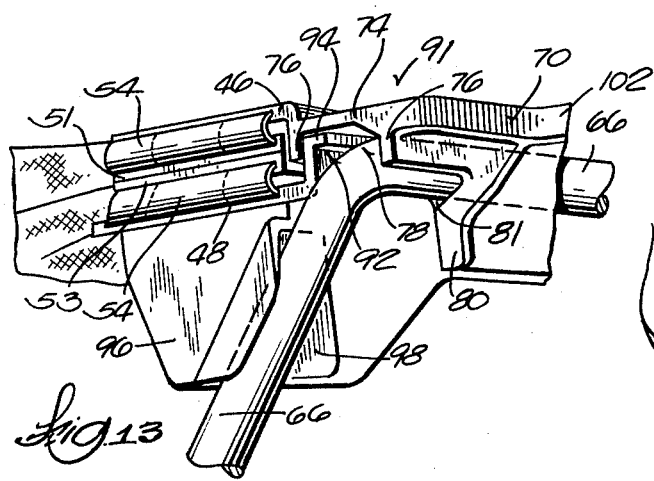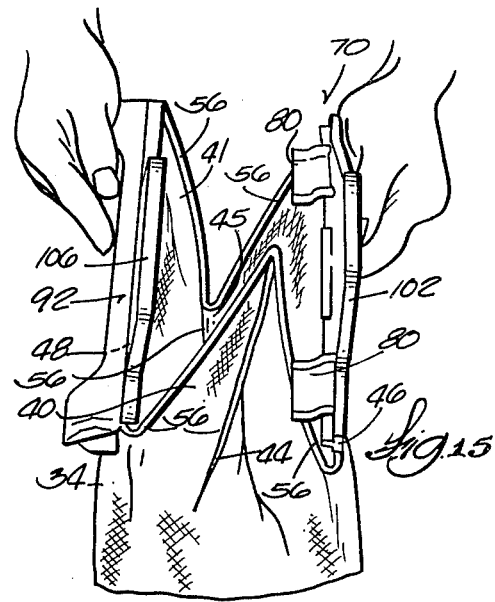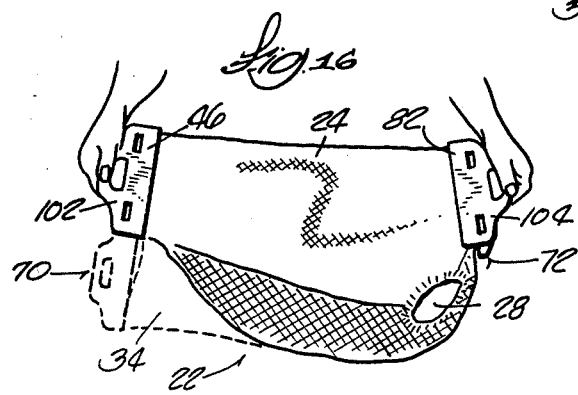

GRASS CATCHER BAG

FIELD OF THE INVENTION

The invention generally relates to bag construction, and more particularly, to a bag which can be used to collect the grass clippings discharged from a rotary powered lawn mower.

DESCRIPTION OF THE PRIOR ART

Attention is directed to the following U.S. Patents which disclose various bag constructions:

| Procter | 518,574 | April 17, 1894 |
|---|---|---|
| Scheuch | 1,028,970 | June 11, 1912 |
| Howard | 2,516,121 | July 25, 1950 |
| Urban | 2,528,192 | October 31, 1950 |

SUMMARY OF THE INVENTION

The invention provides a lawn mower comprising a chassis including a grass discharge outlet and a grass collection bag which includes a main body portion having first and second access openings with the first access opening extending in a plane at a substantial angle to the length of the main portion and being defined by first and second pairs of spaced edges. A first panel having opposite side edges is connected to and is movable between an open position in which the opposite side edges extend generally outwardly from the first access opening and a closed position in which the first panel covers the first access opening. Second and third panels are connected to the opposite side edges of the first panel as well as to the spaced edges of the second pair of edges, and each of the second and third panels is foldable upon itself in response to movement of the first panel from the open position to the closed position along fold lines lying substantially in the plane of the first access opening when the first panel is in the closed position. Closure means in attached to the main body portion of the bag and to the first panel for securing the first panel in the closed position, and mounting means is attached to the chassis and to the main body portion for removably mounting the bag on the chassis with the second access opening attached to the grass discharge outlet.

In accordance with one embodiment of the invention, each of the second and third panels includes means defining the fold lines for moving each of the second and third panels between a generally unfolded position in which each of the second and third panels is generally planar relative to its respective fold line and a generally folded position in which each of the second and third panels is folded upon itself about its fold line.

In accordance with one embodiment of the invention, means is connected to each of the second and third panels and operative in combination with the means which defines the fold line for disposing each of the second and third panels in the generally unfolded position when the first panel is in the open position and for disposing each of the second and third panels in the generally folded position intermediate the first panel and the first access opening when the first panel is in the closed position.

In accordance with one embodiment of the invention, the main body portion of the bag has a first edge which defines the first access opening and along which the first panel is attached to the main body portion and also has a second edge which is oppositely spaced from the first edge. In this embodiment, the first panel includes a top edge which is transverse the opposite side edges and which is located in general registry with the second edge when the first panel is in the closed position. Also in this embodiment, each of the second and third panels includes an outer peripheral edge, and the lawn mower further includes rib means which is attached to the second edge, to the top edge, and to the outer peripheral edges for reinforcing the respective edges. The rib means facilitates the folding action of the second and third panels in response to opening and closing the first panel.

In accordance with one embodiment of the invention, the main body portion of the bag, as well as the first, second and third panels, are all formed of a cloth material. A first seam extends diagonally across each of the second and third panels and intersects the associated outer peripheral edge, the first seam thereby defining the respective fold line for each of the second and third panels. A second seam joins each of the second and third panels to the main body portion of the bag adjacent to and on opposite sides of the first access opening, and, similarly, a third seam joins each of the second and third panels to a respective one of the opposite side edges of the first panel.

In accordance with one embodiment of the invention, the rib means includes a first rib member which extends generally coextensively along the second edge of the main portion of the bag, a second rib member which extends generally coextensively along the top edge of the first panel, a pair of third rib members which extend generally coextensively along each of the outer peripheral edges between the first rib member and the interspection of the respective fold line with the respective outer peripheral edge, and a pair of fourth rib members which extend generally coextensively along each of the outer peripheral edges between the second rib member and the intersection of the respective fold line with the respectively outer peripheral edge. In this embodiment, first hinge means flexibly joins the first rib member with each of the third rib members, and second hinge means flexibly joins the second rib member with each of the fourth rib members. In this embodiment, the first, second, third and fourth rib members are plastic.

In accordance with one embodiment of the invention, the cloth material of the second and third panels is stiffer than the cloth material of the main portion of the bag and of the first panel. In this embodiment, the first seam includes first hem means for forming an inwardly folding fold line on each of the second and third panels, the second seam includes second hem means for forming a rib between each of the second and third panels and the main portion of the bag, and the third seam includes third hem means for forming a rib between each of the second and third panels and the respective opposite side edges of the first panel. In this embodiment, the rib means includes fourth hem means for forming a rib along the outer peripheral edge of each of the second and third panels.

In accordance with one embodiment of the invention, the lawn mower further includes a handle having one end attached to the chassis and an opposite free end spaced from the chassis end. The bag mounting means includes hanger means which is connected to the handle and to the main body portion of the bag for removably attaching the bag to the handle intermediate its chassis end and its free end. In this embodiment, the hanger means includes a first support bar which is connected to the handle adjacent to the free end, a second support bar which is connected to the handle adjacent to the chassis end, first hooking means which is attached to the main body portion adjacent to the first access opening for removably engaging the first support bar, and second hooking means attached to the main portion of the bag and spaced from the first hooking means for removably engaging the second support bar.

In accordance with one embodiment of the invention, the closure means includes third hooking means connected to the first panel for registry with the first hooking means and for common engagement with the first support bar when the first panel is in the closed position.

In accordance with one embodiment of the invention, the lawn mower further includes a first handle which is connected to the main body portion of the bag near the first access opening and a second handle which is attached to the main body portion of the bag and which is spaced from the first handle. In this embodiment, the lawn mower also includes a third handle which is connected to the first panel and movable into registry with the first handle when the first panel is moved from its open position to its closed position.

One of the principal features of the invention is provision of a lawn mower having a grass collection bag which may be closed and sealed without the need of a zipper or the like and which lends itself to easier emptying of the grass collection bag.

Other features and advantages of the embodiments of the invention will become apparent upon reviewing the following general description, the drawings and the appending claims.

DESCRIPTION OF THE DRAWINGS

FIG. 2 is a perspective view of one embodiment the grass discharge bag shown in FIG. 1 and in which the first panel is shown in its open position;

FIG. 3 is the grass discharge bag shown in FIG. 2 in which the first panel is shown in its closed position;

FIG. 4 is a top view of the first rib member assembly taken generally along line 4—4 of FIG. 1;

FIG. 5 is a top sectional view of the inwardly folding second and third panels taken generally along line 5—5 of FIG. 4 and in which the first panel is shown on a partially closed position;

FIG. 6 is a side view of the first rib member and associated third rib member taken generally along line 6—6 of FIG. 4, and in which the first panel is shown in its open position;

FIG. 7 is a fragmentary perspective view of another embodiment of the grass discharge bag shown in FIG. 1, and in which the first panel is shown in its open position;

FIG. 8 is a bottom view of the interlocking registry of the first and third hooking assemblies;

FIG. 9 is a side view, partly broken away, of the overlapping registry of the first, second, third and fourth rib members when the first and third hooking assemblies are interlocked, taken generally along line 9—9 of FIG. 8;

FIG. 10 is a sectional view of the second rib member and associated third hooking assembly taken generally along line 10—10 of FIG. 2;

FIG. 13 is a perspective view, similar to FIG. 9, of the interlocking registry between the first and third hooking assemblies on the first support bar;

FIG. 14 is a perspective view, similar to FIG. 13, but showing an alternative means of assuring the interlocking registry between the first and third hooking assemblies;

FIG. 15 is a top perspective view of the grass discharge bag shown in FIG. 7 with the first panel being moved toward its closed position; and FIG. 16 is a perspective view of the grass discharge bag being held by the operator for dumping.

Figure 1:
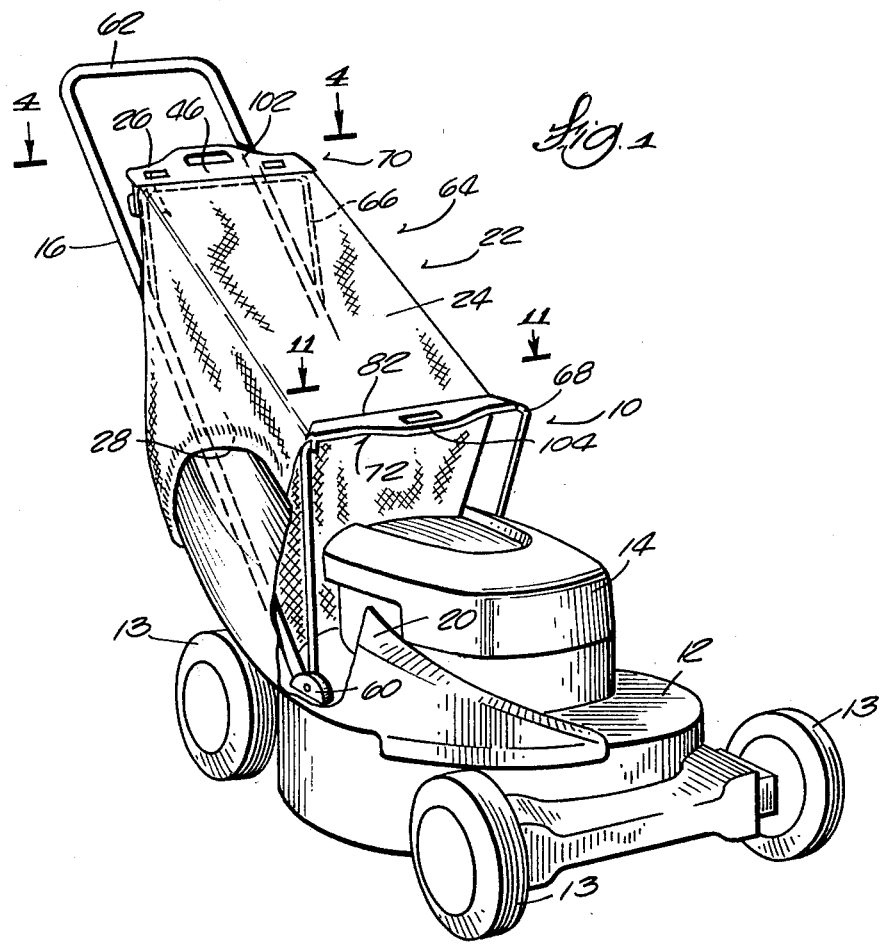
FIG. 1 is a perspective view, partly broken away, of a rotary lawn mower upon which a grass discharge bag embodying various of the features of the invention is attached.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also it is to be understood that the phraseology and terminology being employed herein is for the purpose of description and should not be regarded as limiting.

GENERAL DESCRIPTION

Shown in FIG. 1 is a lawn mower which includes a chassis 12 which houses a rotary cutting blade assembly (not shown) and which is supported by wheels 13 for movement over the ground. An engine 14, typically an internal combustion engine, is mounted on the chassis 12 and drives the cutting blade assembly. A handle 16 is attached to one end of the chassis 12 for guiding lawn mower movement over the ground.

A grass discharge chute 20 is mounted on the chassis 12 so that, as the cutting blade rotates, grass clippings are discharged through the chute 20. As shown in FIG. 1, the chute 20 empties into a grass collection bag 22 which is removably mounted on the chassis 12 and into which the grass clippings are deposited.

Referring now to FIG. 2, the bag 22 includes a main body portion 24 which, in the illustrated embodiment, is made of a cloth material. First and second openings 26 and 28 provide access into the interior of the main body portion 24. The second access opening 28 is suitably attached (See FIG. 1) to the grass discharge chute 20 to direct the discharge of grass clippings into the bag 22. As will soon become apparent, the first access opening 26 serves as an outlet through which the lawn mower operator can empty the accumulated grass clippings from the bag 22.

Still referring principally to FIG. 2, the main body portion 24 has oppositely spaced first and second edges 30 and 32 which define, respectively, the bottom edge 30 and top edge 32 of the first access opening 26 which extends, as shown in FIGS. 2 and 3, in a plane at a substantial angle to the length of the main body portion 24. A first panel 34, which in the illustrated embodiment is also made of cloth, is sewn to the bottom edge 30 of the first access opening 26. The first panel 34 includes a top edge 36 and oppositely spaced side edges 38 and 39 and is movable between an open position (shown in FIG. 2) in which the top panel edge 36 and side panel edges 38 and 39 extend generally outwardly from the first access opening 26 and a closed position (shown in FIG. 3) in which the top panel edge 36 is located in general registry with the top edge 32 of the first access opening 26.

Second and third panels 40 and 41, which in the illustrated embodiment are also made of cloth, are sewn to the respective side edges 38 and 39 of the first panel 34, as well as to the main body portion 24 of the bag 22 along opposite side edges 18 and 19 of the first access opening 26. Each of the second and third panels 40 and 41 is individually cut and sewn together such that a seam, respectively 44 and 45, is located diagonally across each of the second and third panels 40 and 41. Each seam 44 and 45 defines a fold line intersecting the outer peripheral edge 42 and 43 of the respective panel 40 and 41, along which the respective panel 40 and 41 is movable between a generally unfolded position (shown in FIG. 2) in which each of the second and third panels 40 and 41 is generally planar relative to its associated fold line 44 and 45 and a generally folded-together position (shown in phantom lines in FIG. 3) in which each of the second and third panels 40 and 41 is folded upon itself about its associated fold line 44 and 45.

As will be described later herein the panels 40 and 41 are appended to the bag 22 such that they will be simultaneously located in their generally unfolded positions when the first panel 34 is in its open position (as shown in FIG. 2) and are simultaneously moved into their generally folded-together positions when the first panel 34 is moved from its open position to its closed position (as shown in phantom lines in FIG. 3). The folded-together second and third panels 40 and 41 serve to seal the side edges 18 and 19 of the first access opening 26 when the first panel 34 is in its closed position.

While not shown in the drawings, it should be appreciated with the sealing action of the foldable second and third panels 40 and 41 may be accomplished by having the respective panels 40 and 41 simultaneously fold in a direction outwardly of the first access opening 26, and thereafter attaching the outwardly folded panels 40 and 41 by suitable fasteners (also not shown) to the main body portion 24 of the bag 22. However, in the illustrated embodiment, the second and third panels 40 and 41 are caused to fold inwardly toward the first access opening 26.

To facilitate this inwardly folding action, as well as enhance the side sealing action of the panels 40 and 41 once they are disposed in their folded-together positions, the top edge 32 of the main body portion 24 of the bag 22, the top edge 36 of the first panel 34, as well as the outer peripheral edges 42 and 43 of the second and third panels 40 and 41 are all reinforced, or "stiffened". While it should be appreciated that there are numerous ways to stiffen the above described edges, two alternative embodiments are shown, the first being best illustrated in FIGS. 2, 4, 5 and 6 and the second being illustrated in FIGS. 7 and 15.

Referring now to FIGS. 2, 4, 5 and 6 and the first "stiffening" embodiment shown therein, the stiffening action is accomplished by a series of rib members which extends along the exterior portions of the above mentioned edges 32, 36, 42 and 43. More particularly, a first rib member 46 extends coextensively along the top edge 32 of the main body portion 24, and in similar fashion, a second rib member 48 extends generally coextensively along the top edge 36 of the first panel 34. A pair of third rib members 50 and 51 is flexibly joined to opposite ends of the first rib member 46 and commonly extends along the upper portion of each of the outer peripheral edges 42 and 43 between the first rib member 46 and the associated fold line 44 and 45. Similarly, a pair of fourth rib members 52 and 53 is flexibly joined to opposite ends of the second rib member 48 and commonly extends along the lower portion of each of the outer peripheral edges 42 and 43 between the second rib member 48 and the associated fold line 44 and 45.

While the rib members just described may be variously constructed, in the illustrated embodiment, they all take the form of plastic strips which are sewn along the exterior portions of the respective edges of the bag 22. Resilient plastic webbing 54 (as best shown in FIGS. 5, 13 and 14) flexibly joins the third rib members 50 and 51 to opposite ends of the first rib member 48, as well as joins the fourth rib members 52 and 53 to opposite ends of the second rib member 48. Thus, pivotal hinge-like movement between the respective rib members is permitted during movement of the first panel 34 between its open and closed positions.

Referring next to FIGS. 7 and 15, and the alternative "stiffening" embodiment shown therein, the cloth material of the second and third panels 40 and 41 is made of a stiffer fabric than the cloth material shared by the main body portion 24 of the bag 22 and the appended first panel 34. Like the first described embodiment, first and second plastic rib members 46 and 48 are sewn in place onto the bag 22, but instead of the third and fourth plastic rib members 50, 51 and 52, 53, stiffening hems 56 are sewn along the outer peripheral edges 42 and 43, along the fold line seams 44 and 45, and along the seams which join the second and third panels 40 and 41 to the main body portion 24 of the bag 22 and to first panel 34. As is shown in FIG. 15, as the first panel 34 is moved from its open position toward its closed position, the stiffening hems 56 act in the same fashion as the stiffening ribs of the first described embodiment (shown in FIG. 5) to direct the inwardly folding action of the panels 40 and 41 inwardly toward the first access opening 26.

As best shown in FIG. 9, when the first panel 34 is in its closed position, the plastic stiffening ribs (or, alternatively, the sewn stiffening hems) are positioned in overlapping registry with each other between the first rib member 46 and the second rib member 48, thereby sealing the side edges 18 and 19 of the first access opening 26 to prevent the escape of grass clippings therefrom. It is to be appreciated that this sealing action is accomplished without the use of zippers or the like which may become jammed or corroded by the grass clippings accumulated in the bag 22.

As before mentioned, the grass collection bag 22 can be removably mounted on the lawn mower chassis 12. As is shown in FIG. 1, the handle 16 includes one end 60 which is attached to the lawn mower chassis 12 and a free end 62 which extends from the chassis 12. Hanger means 64 is connected to the handle 16 and to the main portion 24 of the bag 22 for hanging the bag 22 on the handle 16 between the chassis end 60 and the free end 62.

While the hanger means 64 may be variously constructed, in the illustrated embodiment (and still referring to FIG. 1), a first support bar 66 is connected adjacent to the free end 62 of the handle 16, and an associated first hooking assembly 70 is attached to the main body portion 24 of the bag 22 adjacent to the first access opening 26 and is adapted to engage the first support bar 66. In similar fashion, a second support bar 68 is connected to the chassis end 60 of the handle 16, and an associated second hooking assembly 72 is attached to the main body portion 24 of the bag 22 and is spaced from the first hooking assembly 70, being thereby adapted to engage the second support bar 68.

As best shown in FIGS. 2, 4, and 6, the first hooking assembly 70 is an integral part of the first rib member 46 and, like the first rib member 46, is made of plastic. The first hooking assembly 70 includes a lip 74 which extends outwardly from the first rib member 46 and which has a spaced pair of downwardly depending ridges 76 which form a channel 78 or groove along the entire length of the first rib member 46. As is best shown in FIG. 6, the first support bar 66 is accommodated within this channel 78 and is held in place therein by a pair of generally hook-shaped shoulders 80 extending from the lip 74 and having outwardly projecting tab members 81 which lodge the first support bar 66 in place in the channel 78.

Figure 11:
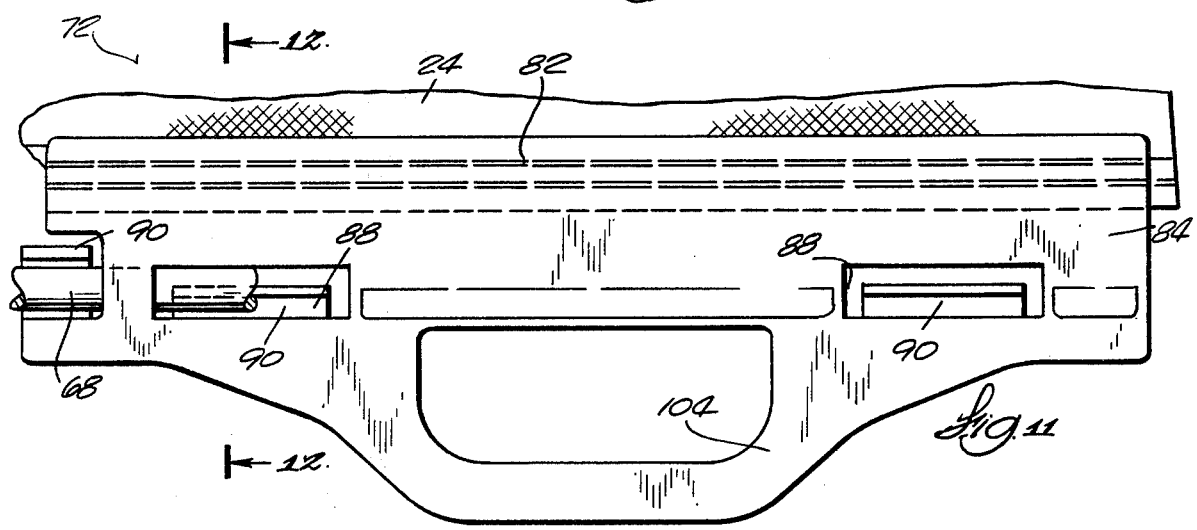
FIG. 11 is a top view of the fifth rib member and associated second hooking assembly attached to the grass discharge bag and as taken generally along line 11—11 of FIG. 1.
Figure 12:
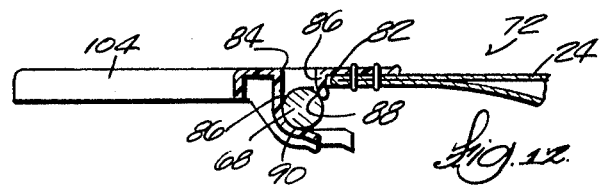
FIG. 12 is a sectional view of the fifth rib member and associated second hooking assembly taken generally along line 12—12 of FIG. 11.

As is shown in FIGS. 11 and 12, the second hooking assembly 72 is similar in construction to the just described first hooking assembly 70 and includes a fifth rib member 82 (see also FIGS. 1 and 2) which is sewn to an edge of the main body portion 24 of the bag 22 and which is spaced from the top edge 32 of the first access opening 26. Like the first hooking assembly 70, the second hooking assembly 72 includes an outwardly projecting lip 84 having downwardly depending ridges 86 forming a channel 88 or groove into which the second support bar 68 fits. Also like the first hooking assembly 70, a series of spaced, generally hook-shaped shoulders 90 extend from the lip 84 along the channel 88 and cooperate in lodging the second support bar 68 in the channel 88.

Closure means 91 is provided to maintain the first panel 34 in its closed, or sealed, position when the bag 22 is supported on the handle 16. More particularly, and referring first to FIG. 10, a third hooking assembly 92 is integrally connected with the second rib member 48 and includes a lip 94 which extends outwardly of the second rib member 48. As is shown in FIGS. 9, 13 and 14, when the first panel 34 is moved into its closed position, the lip 94 is accommodated within the heretofore described channel 78 of the first hooking assembly 70, and the first support bar 70 can thereafter be lodged by the tabs 81 within the common registry of the first hooking assembly 70 with the third hooking assembly 92, thereby holding the first panel 34 in its closed position.

To assure that the plastic stiffening ribs (or, alternatively, the sewn stiffening hems) are maintained in tight overlapping registry with each other by the overlapping engagement of the first hooking assembly 70 and third hooking assembly 92 with the first support bar 66, an auxiliary sealing member 96 (as shown in FIGS. 8, 9, 10 and 13) extends below the underbody of second rib member 48. An oppositely spaced pair of end grooves 98 (as best shown in FIG. 13) are formed in the auxiliary sealing member 96. The end grooves 98 accommodate the downwardly depending side portions of the first support bar 66 when the first hooking assembly 70 and third hooking assembly 92 are in registry with each other and commonly engaged by the first support bar 66. By virtue of this construction, the side portions of the first support bar 66 support the second rib member 48 to prevent separation between the first and second rib members 46 and 48. Thus, the auxiliary sealing member 96 assures tight registry between the first and second rib members 46 and 48, and the intermediate overlapping second and third rib members 50, 52 and 51, 53 (or equivalent hems 56) are thereby sandwiched tightly between the first and second rib members 46 and 48 to complete the side sealing action as heretofore described.

An alternate embodiment of an auxiliary sealing member is shown in FIG. 14. In this construction, a pair of hook-shaped members 100 curve outwardly from opposite sides of the second rib member 48 and are flexibly movable into snap-fit engagement over the top edge of the first rib member 46 when the first panel 34 is located in its closed position, thereby holding the first and second rib members in tight overlapping registery in similar fashion as the just described auxiliary sealing member 96.

To facilitate handling of the bag 22, a first handle 102 is connected to the main body portion 24 of the bag 22 near the first access opening 26. In the illustrated embodiment, the first handle 102 forms an integral part of the first rib member 46 and associated first hooking assembly 70. Similarly, a second handle 104 forms an integral part of the fifth rib member 82 and associated second hooking assembly 72. As shown in FIG. 16, the grass collection bag 22 may be easily lifted and carried by the operator using the first and second handles 102 and 104 for placement upon or removal from the first and second support bars 68 and 70, as well as handled for dumping the grass clippings from the first access opening 26.

A third handle 106 is connected to the first panel 34 and, in the illustrated embodiment (see FIG. 10), forms an integral part of the second rib member 48 and associated third hooking assembly 92. As best shown in FIG. 9, the third handle 106 is movable into registry with the first handle 102 when the first panel is placed in its closed position. The provision of the third handle 106 facilitates movement of the first panel 34 between its open and closed positions as well as carrying the bag 22 to a remote dumping site with the first panel 34 held by the operator in its closed position.

Various features of the invention are set forth in the following claims.

I claim:

1. A lawn mower comprising a chassis including a grass discharge outlet, a grass collection bag including a main portion having first and second access openings, said first access opening extending in a plane at a substantial angle to the length of said main portion and being defined by first and second pairs of spaced edges, a first panel having opposite side edges and connected to one of said edges of said first pair of edges and movable between an open position in which said opposite side edges extend generally outwardly from said first access opening and a closed position in which said first panel covers said first access opening, a second panel connected to one of said opposite side edges and to, one of said edges of said second pair of edges, a third panel connected to the other one of said opposite edges and to the other of said edges of said second pair of edges, said second and third panels each being foldable upon itself in response to movable of said first panel from said open position to said closed position along fold lines lying substantially in the plane of said first access opening when said first panel is in said closed position, closure means attached to said main portion and to said first panel for securing said first panel in said closed position, and mounting means attached to said chassis and to said main portion for removably mounting said bag on said chassis with said second access opening attached to said grass discharge outlet.

2. A lawn mower according to claim 1 wherein each of said second and third panels includes means for causing each of said second and third panels to fold inwardly toward said first access opening in response to movement of said first panel from said open position to said closed position.

3. A lawn mower according to claim 1 wherein each of said second and third panels includes means defining said fold lines for moving each of said second and third panels between a generally unfolded position in which each of said second and third panels is generally planar relative to said respective fold line and a generally folded position in which each of said second and third panels is folded upon itself about said respective fold line.

4. A lawn mower according to claim 3 wherein each of said second and third panels includes means operative in combination with said means defining said fold line for disposing each of said second and third panels in said generally unfolded position when said first panel is in said open position and for disposing each of said second and third panels in said generally folded position intermediate said first panel and said first access opening when said first panel is in said closed position.

5. A lawn mower according to claim 1 wherein each of said second and third panels includes means for disposing each of said second and third panels in a generally unfolded position when said first panel is in said open position in which each of said second and third panels is generally planar relative to said respective fold line and extends generally outwardly from said first access opening and for disposing each of said second and third panels in a generally folded position when said first panel is in said closed position in which each of said second and third panels is folded upon itself about said respective fold line.

6. A lawn mower according to claim 1 wherein said main portion has a first edge defining said first access opening and along which said first panel is attached to said main portion, and having a second edge oppositely spaced from said first edge, wherein said first panel includes a top edge transverse said opposite side edges and located in general registry with said second edge when said first panel is in said closed position, wherein each of said second and third panels includes an outer peripheral edge, and further including rib means attached to said second edge, to said top edge, and to each of said outer peripheral edges for reinforcing said respective edges.

7. A lawn mower according to claim 6 wherein said main portion and said first, second and third panels are formed of a cloth material, and further including a first seam extending diagonally across each of said second and third panels and intersecting said respective outer peripheral edge, said first seam thereby defining a fold line, a second seam joining each of said second and third panels to said main portion adjacent to and on opposite sides of said first access opening, and a third seam joining each of said second and third panels to a respective one of said opposite side edges of said first panel.

8. A lawn mower according to claim 7 wherein said cloth material of said second and third panels is stiffer than said cloth material of said main portion and said first panel, wherein said first seam includes first hem means for forming an inwardly folding fold line on each of said second and third panels, wherein said second seam includes second hem means for forming a rib between each of said second and third panels and said main portion, and wherein said third seam includes third hem means for forming a rib between each of said second and third panels and said respective opposite side edges of said first panel.

9. A lawn mower according to claim 8 wherein said rib means includes fourth hem means for forming a rib along said outer peripheral edge of each of said second and third panels.

10. A lawn mower according to claim 6 wherein said rib means includes a first rib member extending generally coextensively along said second edge of said main portion, a second rib member extending generally coextensively along said top edge of said first panel, a pair of third rib members extending generally coextensively along said outer peripheral edges intermediate said first rib member and the intersection of said respective fold line with said respective outer peripheral edge, and a pair of fourth rib members extending generally coextensively along said outer peripheral edges intermediate said second rib member and the intersection of said respective fold line with said respective outer peripheral edge.

11. A lawn mower according to claim 10 and further including first hinge means for flexibly joining said first rib member with said pair of third rib members, and second hinge means for flexibly joining said second rib member with said pair of fourth rib members.

12. A lawn mower according to claim 10 wherein said first, second, third and fourth rib members are plastic.

13. A lawn mower according to claim 1 and further including a handle having one end attached to said chassis and an opposite free end, and wherein said bag mounting means includes hanger means connected to said handle and to said main portion for removably attaching said bag to said handle intermediate said chassis end and said free end.

14. A lawn mower according to claim 13 wherein said hanger means includes a first support bar connected to said handle adjacent to said free end, a second support bar connected to said handle adjacent to said chassis end, first hooking means attached to said main portion adjacent to said first access opening for removably engaging said first support bar, and second hooking means attached to said main portion and spaced from said first hooking means for removably engaging said second support bar.

15. A lawn mower according to claim 14 wherein said closure means includes third hooking means connected to said first panel for registry with said first hooking means and for common engagement with said first support bar when said first panel is in said closed position.

16. A lawn mower according to claim 1 and further including a first handle connected to said main portion near said first access opening and a second handle attached to said main portion and spaced from said first handle.

17. A lawn mower according to claim 16 and further including a third handle connected to said first panel and movable into registry with said first handle when said first panel is moved from said open position to said closed position.

18. A grass collection bag including an elongated main portion having first and second access openings, said first access opening extending in a plane at a substantial angle to the length of said main portion and being defined by first and second pairs of spaced edges, a first panel having opposite edges, and connected to one of said edges of said first pair of edges, and being movable between an open position in which said opposite side edges extend generally outwardly from said first access opening and a closed position in which said first panel covers said first access opening, a second panel connected to one of said opposite side edges and to one of said edges of said second pair of edges, a third panel connected to the other one of said opposite edges and to the other of said edges of said second pair of edges, said second and third panels each being foldable upon itself in response to movement of said first panel from said open position to said closed position along fold lines lying substantially in the plane of said first access opening when said first panel is in said closed position, and closure means attached to said main portion and to said first panel for securing said first panel in said closed position, said second access opening being adapted for removable connection to the grass discharge outlet of a lawn mower.

19. A grass collection bag according to claim 18 wherein each of said second and third panels includes means for causing each of said second and third panels to fold inwardly toward said first access opening in response to movement of said first panel from said open position to said closed position.

20. A grass collection bag according to claim 18 wherein each of said second and third panels includes means defining said fold lines for moving each of said second and third panels between a generally unfolded position in which each of said second and third panels is generally planar relative to said respective fold line and a generally folded position in which each of said second and third panels is folded upon itself about said respective fold line.

21. A grass collection bag according to claim 20 wherein each of said second and third panels includes means operative in combination with said means defining said fold line for disposing each of said second and third panels in said generally unfolded position when said first panel is in said open position and for disposing each of said second and third panels in said generally folded position intermediate said first panel and said first access opening when said first panel is in said closed position.

22. A grass collection bag according to claim 18 wherein each of said second and third panels includes means for disposing each of said second and third panels in a generally unfolded position when said first panel is in said open position in which each of said second and third panels is generally planar relative to said respective fold line and extends generally outwardly from said first access opening and for disposing each of said second and third panels in a generally folded position when said first panel is in said closed position in which each of said second and third panels is folded upon itself about said respective fold line.

23. A grass collection bag according to claim 18 wherein said main portion has a first edge defining said first access opening and along which said first panel is attached to said main portion, and having a second edge oppositely spaced from said first edge, wherein said first panel includes a top edge transverse said opposite side edges and located in general registry with said second edge when said first panel is in said closed position, wherein each of said second and third panels includes an outer peripheral edge, and further including rib means attached to said second edge, to said top edge, and to each of said outer peripheral edges for reinforcing said respective edges.

24. A grass collection bag according to claim 23 wherein said main portion and said first, second and third panels are formed of a cloth material, and further including a first seam extending diagonally across each of said second and third panels and intersecting said respective outer peripheral edge, said first seam thereby defining a fold line, a second seam joining each of said second and third panels to said main portion adjacent to and on opposite sides of said first access opening, and a third seam joining each of said second and third panels to a respective one of said opposite side edges of said first panel.

25. A grass collection bag according to claim 24 wherein said cloth material of said second and third panels is stiffer than said cloth material of said main portion and said first panel, wherein said first seam includes first hem means for forming an inwardly folding fold line on each of said second and third panels, wherein said second seam includes second hem means for forming a rib between each of said second and third panels and said main portion, and wherein said third seam includes third hem means for forming a rib between each of said second and third panels and said respective opposite side edges of said first panel.

26. A grass collection bag according to claim 25 wherein said rib means includes fourth hem means for forming a rib along said outer peripheral edge of each of said second and third panels.

27. A grass collection bag according to claim 23 wherein said rib means includes a first rib member extending generally coextensively along said second edge of said main portion, a second rib member extending generally coextensively along said top edge of said first panel, a pair of third rib members extending coextensively along said outer peripheral edges intermediate said first rib member and the intersection of said respective fold line with said respective outer peripheral edge, and a pair of fourth rib members extending generally coextensively along said outer peripheral edges intermediate said second rib member and the intersection of said respective fold line with said respective outer peripheral edge.

28. A grass collection bag according to claim 27 and further including first hinge means for flexibly joining said first rib member with said pair of third rib members, and second hinge means for flexibly joining said second rib member with said pair of fourth rib members.

29. A grass collection bag according to claim 27 wherein said first, second, third and fourth rib members are plastic.

30. A grass collection bag according to claim 18 and further including a first handle connected to said main portion near said first access opening and a second handle attached to said main portion and spaced from said first handle.

31. A grass collection bag according to claim 30 and further including a third handle connected to said first panel and movable into registry with said first handle when said first panel is moved from said open position to said closed position.

* * * * *